March 10, 1931.   E. L. RASMUSSEN   1,795,441
WEEDING DEVICE
Filed July 18, 1928
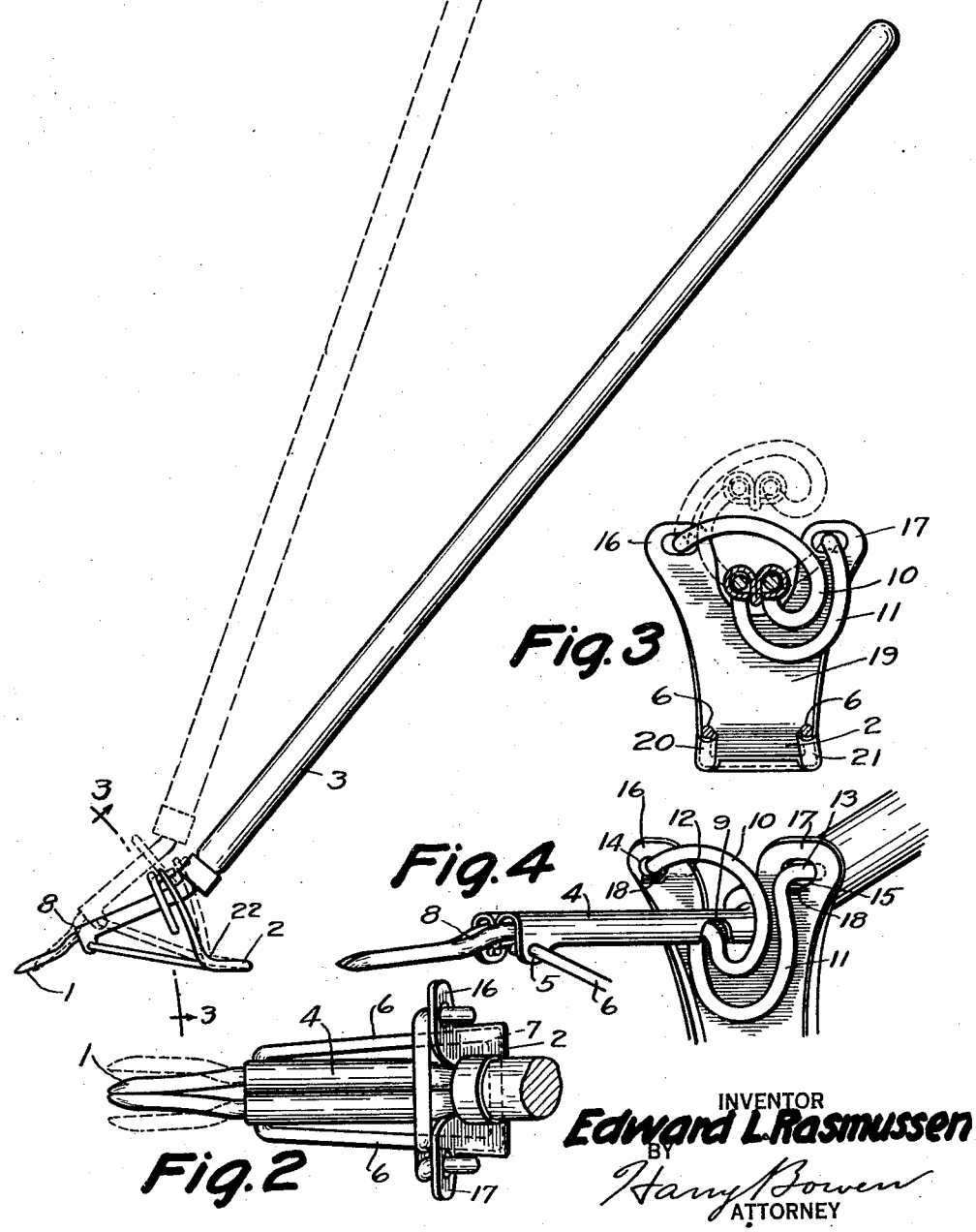

Patented Mar. 10, 1931

1,795,441

UNITED STATES PATENT OFFICE

EDWARD L. RASMUSSEN, OF SEATTLE, WASHINGTON

WEEDING DEVICE

Application filed July 18, 1928. Serial No. 293,702.

The invention is a device for pulling weeds having a pair of pivotally mounted prongs, a handle and a base in which the prongs open and close as the handle is raised and lowered.

The object of the invention is to provide a manually operated mechanical device which will positively grip and pull weeds of any size and which is adaptable for lawn or garden use.

Another object of the invention is to provide a weed pulling device which may readily be operated while standing.

Another object of the invention is to provide a weed pulling device which will not tear up the lawn.

Another object of the invention is to provide a weed pulling device with a base forming a fulcrum and having a foot rest thereon by which the prongs may be forced into hard dry soil.

Another object of the invention is to provide a device for pulling weeds which may be pushed downward into the ground by foot to grip the weed below the surface.

Another object of the invention is to provide a device for pulling weeds which is adaptable to pull very small or very large weeds.

Another object of the invention is to provide a device for pulling weeds which will not break or cut the weeds.

Another object of the invention is to provide a device for pulling weeds which is automatically released after the weeds are pulled.

Another object of the invention is to provide a device for pulling weeds which will pull the entire root of the weed.

A further object of the invention is to provide a device for pulling weeds which will automatically grip the weed as it is pulling upward.

A still further object of the invention is to provide a mechanical movement for a weed pulling device which will automatically operate the weed gripping members as it is pushed downward.

And a still further object of the invention is to provide a weed pulling device which is of a simple and economical construction.

With these ends in view the invention embodies a pair of pivotally mounted offset prongs, a handle, a base pivotally attached to the device and suitable levers between the prongs and base for operating the prongs as the handle is moved downward.

Other features and advantages of the invention will appear from the following description taken in connection with the drawings, wherein:

Figure 1 is a view showing the device as it would appear in use.

Figure 2 is a plan view showing the prongs and base.

Figure 3 is a cross section on line 3—3 of Figure 1 showing the operating mechanism.

Figure 4 is a side view showing the relative positions of the prongs and operating mechanism.

In the drawings the device is shown as it would be made wherein numeral 1 indicates the prongs, numeral 2 the base and numeral 3 the handle.

The prongs 1 are made of round bars with the ends beveled on the outer edges as shown. It will be noted that the engaging surfaces of the prongs are comparative straight. The prongs are pivotally held in a double sleeve 4 which is formed as shown in Figures 3 and 4 and provided with ears 5 at the outer ends to which rods 6 extending from the rear of the base are connected. The rods 6 may be made of a single piece of material bent to form a U about midway of its length as indicated by the dotted lines 7 in Figure 2 and then bent slightly inward with the ends bent inward so that they may be placed through openings in the ears 5 as shown. The rods 6 curve upward at the point 8 and pass into the double sleeve 4 and the inner ends are bent at right angles and curved to form the operating mechanism by which the rods are rotated. The inner ends of the rods pass out the sleeve 4 through openings 9 as shown in Figure 4 and are curved as indicated by the numerals 10 and 11 so that the ends 12 and 13 which are bent at right angles may pass through openings 14 and 15 in the upwardly extending portions 16 and 17 of the base. The lower sides of the openings 14 and 15 may be provided with extensions 18 which are reenforcements for the bearing edges thereof. The portions 16 and 17 of the base are connected to a common back portion 19 which extends downward to the base 2 and it will be observed that the edges of the base are bent around the midsection of the rod 6 as shown at the points 20 and 21. The edges of the base 2 are bent around the rod 6 to positively hold the rods to the base. The inner end of the member 4 is bent inward and upward and the handle 3 is attached to it by forcing it upward into the end of the handle or by any other suitable means. It will be noted that the back 19 and base 2 are formed of a flat piece of material which is bent upward at the point 22 as shown. It will be understood, however, that this member may be made in any suitable shape or of any suitable material and arranged in any suitable manner.

It will be understood that changes may be made in the construction without departing from the spirit of the invention. One of which changes may be in the design or arrangement of the prongs as it is understood that these may be made of any suitable material and arranged in any suitable manner. Another may be in the design or arrangement of the double sleeve 4 as it is understood that any suitable means may be used for pivotally attaching the prongs to the handle and base, and still another may be in the use of a handle of any suitable type as it is understood that it may be longer or shorter or arranged in any suitable manner.

The construction will be readily understood from the foregoing description. In use the device may be supplied as shown and the end of the prongs may be placed around a weed or forced into the ground around a weed with the handle in the upward position and the prongs open as shown in dotted lines in Figure 2, the handle may then be pushed downward from the position shown in dotted lines in Figure 1 to the position shown in full lines and as it moves downward the curved portions 10 and 11 of the prongs will move from the position shown in dotted lines in Figure 3 to the position shown in full lines and therefore cause the prongs to move from the position shown in dotted lines in Figure 2 to the position shown in full lines so that they will positively grip the weed. It will therefore be observed that the device may readily be placed about a weed and then pushed downward to pull the weed and the prongs may be forced into the ground so that regardless how small or short the weed is it may readily be gripped and the entire weed withdrawn. The prongs are round so that they will not cut the weeds as they grip them and the ends of the prongs are pointed so that they may be placed around a very small weed in lawn grass without disturbing the grass or between very small plants without disturbing the plants, and at the same time the larger portion of the prongs is adaptable to grip a large weed so that it is possible to use the device for very small or large weeds. It is readily seen that as soon as the device is picked up by the handle, the handle will raise and the prongs will immediately open to release the weed so that the device may be operated continuously with one hand and with considerable speed. It is also understood that the device may be used for many other purposes.

Having thus fully described the invention, what I claim as new and desire to secure by Letters Patent, is:

1. In a weed pulling device, a pair of pivotally mounted prongs, a double sleeve in which the prongs are mounted, said prongs curved slightly downward at the outer end of the sleeve and extending outward at right angles to the sleeve and through slots therein at the opposite ends, the said opposite ends of the said prongs curving about the centers and bent at right angles at their outer ends, a plate forming a base having upwardly extending portions with slots in the upper ends to receive the ends of the curved portions of the prongs, rods attached to the outer end of the double sleeve and to the rear of the base and a handle attached to the end of the double sleeve and extending a considerable distance from the sleeve to enable the device to be used while standing.

2. In a device of the class described, a pair of pivotally mounted offset prongs pointed at their outer ends and having their inner ends bent at substantially right angles and curved with the outer end of the curved portion bent at right angles or parallel to the prongs, a housing pivotally supporting the prongs and having slots through which the curved ends project, a handle at the end of the housing, and a base pivotally attached to the housing and provided with loops in which the ends of the curved members of the prongs are freely mounted.

3. In a device of the class described, a pair of bars, a housing in which the bars are pivotally mounted, a handle at the end of the housing, a stand to which the housing is pivotally attached at the forward end, and a suitable connection between the bars and stand at the inner end to cause the bars to rotate as they are moved in relation to the stand.

4. In a device of the class described, a pair of round bars with their outer ends offset and pointed and their inner ends bent to form operating levers, a housing in which the bars are pivotally mounted, and a stand in which the housing is pivotally supported, said stand pivotally supporting the housing at the forward end and being provided with means to cooperate with the inner ends of the bars to cause them to rotate as they are moved in relation thereto.

5. In a weeding device of the class described, a handle, bars pivotally mounted in the handle the outer ends of the said bars being slightly offset in such a manner that as the bars are rotated the offset portions thereof will move away from each other or toward each other, a base in which the device is pivotally mounted at the forward end, and means cooperating with the said bars and base at the inner end to rotate the bars to open or close the offset portions as the handle is moved in relation to the base.

6. In a weeding device of the class described, a handle, bars rotatably mounted in the handle, offset portions at the outer ends of the bars adaptable to move together or separate as the bars are rotated, levers extending from the inner ends of the bars, a base in which the handle is pivotally mounted at the forward end, and means at the inner end of the said base to engage the inner ends of the bars to rotate the bars as the handle is moved in relation to the base.

7. In a device of the class described, a base, a housing pivotally supported at the forward end of the base, bars rotatably mounted in the housing, means for connecting the bars to the base at the inner end to rotate the bars as they are moved about the pivot, gripping means at the outer ends of the bars operable by the movement of the bars in relation to the base, and a suitable handle at the ends of the bars.

8. In a device of the class described, a housing, bars rotatably mounted in the housing, means for pivotally supporting the housing at the forward end, gripping means at the outer ends of the bars, and means connecting the inner ends of the bars to the housing supporting means to operate the gripping means as the housing is moved in relation to its supporting means.

9. In a device of the class described, a pair of bars, means in which the bars are rotatably mounted, gripping means at the outer ends of the bars, levers attached to the inner ends of the bars, means for pivotally supporting the outer ends of the bars through the means in which they are mounted, and means in the said supporting means cooperating with the levers at the inner ends of the bars to rotate the bars to operate the gripping means.

10. A weeding implement comprising a base frame adapted for use as a fulcrum, a handle adapted for use as a lever and relatively movable in the frame, a pair of normally open jaws at the ends of bars, said bars adapted to turn within the handle, and means connecting the inner ends of the bars to the base whereby the initial lever movement of the handle turns said bars to close the jaws about the weed.

11. A weeding implement comprising a base frame having lateral loops and adapted for use as a fulcrum, a lever-handle pivotally mounted at the forward end of the said base frame, a pair of bars carried by and adapted to turn in the handle and a pair of normally open jaws at the ends of said bars, cross arms on the bars, and pivot ends on the said cross arms loosely retained in said loops.

In testimony whereof I affix my signature.

EDWARD L. RASMUSSEN.